United States Patent [19]

Gruner

[11] 4,024,959
[45] May 24, 1977

[54] MECHANICAL HANDLING APPARATUS

[76] Inventor: Hans Gruner, Hausen, Germany

[22] Filed: Nov. 11, 1974

[21] Appl. No.: 522,991

[30] Foreign Application Priority Data

Nov. 9, 1973 Germany .......................... 2355971

[52] U.S. Cl. .......................... 214/1 BB; 214/1 BC; 214/1 BD
[51] Int. Cl.² ......................................... B25J 19/00
[58] Field of Search ............ 214/1 BB, 1 BD, 1 BC, 214/1 BV, 8.5 D, 1 BH; 294/88; 192/150

[56] References Cited

UNITED STATES PATENTS

| 3,404,789 | 10/1968 | Georgeff | 214/8.5 D |
|---|---|---|---|
| 3,523,599 | 8/1970 | Denkowski | 192/150 |
| 3,637,250 | 1/1972 | Blonsky | 294/88 |
| 3,746,184 | 7/1973 | Wallis | 214/1 BB |
| 3,870,164 | 3/1975 | Haase | 214/1 BC |

Primary Examiner—Robert J. Spar
Assistant Examiner—Randolph A. Reese
Attorney, Agent, or Firm—Watson, Cole, Grindle & Watson

[57] ABSTRACT

A handling device has a flexible gripper having a drive associated with one movement of the gripper and including a member which is caused to move against an adjustable force when an actuating force determined by the adjustable force acts on the gripper, and a switch element operable by the displaced member and serving to control at least one movement of the handling device and/or the gripper.

22 Claims, 13 Drawing Figures

MECHANICAL HANDLING APPARATUS

The invention relates to a mechanical handling device with a flexible gripper capable of carrying out certain activities. Handling devices of this type have been used in connection with the most varied actions, for example, when handling objects such as tools or components automatically in order to reduce manual labour; or when handling radio-active objects, that is to say when objects have to be dealt with which have to be kept away from the human body and demand additional precaution in order to be harmless to man. In order to be as versatile as possible, a handling device should be capable of moving in all three spatial directions.

THE PRIOR ART

With known mechanical handling devices incorporating a gripper which can be moved consecutively in various directions, the gripper movements are controlled for example by means of trailing cams which move along with the gripper, or by means of limit switches which actuate, on completion of a pre-set gripper motion, a switch-element to initiate the next function. Handling devices are also known which are used in conjunction with a computer into which the gripper movements are fed. It is common to all known handling devices that the distance covered by the gripper when performing its movements is pre-determined, that is to say, the end positions of the gripper are predetermined with each action. However, this has certain severe drawbacks. It is, for example, impossible to stack up, by the aid of one of the known handling devices, a number of objects, because in such a case the gripper would have to execute a different motion, covering a different distance, each time an additional object is placed upon the last one on the stack. Similarly, the known devices are not capable of placing a number of objects consecutively to form a continuous row because, again, the distance covered by the gripper would vary between one handled object and the next. If then, any of the known devices were to be used for these purposes, the controlling switch-system would have to be re-adjusted after each of the consecutive operations. This, however, is too cumbersome and time-consuming to be practical. Apart from these drawbacks, it is possible that the loading position which corresponds to a given end position of the gripper is occupied for whatever reason by another object. In such a case the gripper, advancing towards its end position with its full energy, would damage or destroy at least one of the two objects in question or even the handling device itself. It is similarly necessary to ensure that the objects to be picked up by the gripper during its consecutive reloading activity, always occupy exactly the same starting position, or the gripper might miss the objects.

Correspondingly, it is important that objects consecutively put down at a given loading position should be removed without delay in order to avoid their occupying the position too long. It is an additional drawback of the known handling devices that they could cause damage to sensitive or fragile goods, such as glassware, with slightly varying dimensions. This is, however, inevitably the case with roughly finished objects. The gripper, adjusted for a pre-determined distance to cover and not for the dimensions of the articles handled, can easily cause damage when the goods are put down in accordance with the pre-set length of the gripper movement, missing the optimum position on, say, a base. These difficulties restrict the range of application of the handling devices considerably: The grippers can only perform certain movements as laid down by a given repetitive program, which acts periodically in dependence on the completed gripper movements. It is an additional drawback of handling devices operated in conjunction with a computer or electronic calculator, that their manufacturing costs are very high. Finally, a grave danger is to be taken into consideration: Any person standing in the vicinity of the handling device in an unfavorable position could be pushed against a wall or even pressed to death by a handling device whose grippers cannot stop before reaching the end position. It is an aim of the present invention to provide a handling device which is free from the drawbacks of the known mechanical handling devices.

According to the invention, the problem has been solved by a drive system associated with at least one of the gripper motions, the system comprising a flexible member which can be displaced against the direction of an adjustable force, so that it is moved against this force when an actuating load, determined by the latter, acts on the gripper, said member also operating a switch-element which serves for the control of at least one movement of the device and/or the gripper. If the gripper touches a mechanical resistance, for example, in collision with an object, the displaceable member in the drive system is caused to move against the adjustable force, actuating thereby the switch-element which releases, say, the next gripper movement. In other words, the control of the gripper motions is a function of force, and not a function of distance. The new device is therefore capable, for example, of placing a number of objects side by side, forming a row, because the gripper approaches the last of the already positioned objects closely enough to be actuated by its presence. The versatility of the new handling device, that is to say the numerous actions it can carry out, becomes evident by the fact that the handling device is capable of removing individual objects from a stack or of adding further objects to an existing stack. In these cases the gripper is actuated as soon as it is in contact with the stack, the latter actuating a switch-element which orders the gripper, for example, to close its jaws around a component. There is, moreover, no danger of persons being injured by the mechanical handling device even in the event of a gripper touching the person, because the order given by the actuating force would become effective at the moment the impact occurs, and the switch-element would react accordingly. It is an advantage to associate individual movable members which are displaceable against an adjustable force and capable of actuating a switching element, with a number of gripper movements instead of providing only one of the gripper motions with this facility; and it should be ensured that these switching elements control the programmed movements of the gripper. A program of this kind need not be periodical in relation to the distances covered by the gripper, but it is periodical in relation to the forces which release the gripper movements. In a way, the gripper itself acts as a feeler which transmits the relevant information into the switch-element as soon as it touches a resisting object. The actuating force directed against a first gripper movement is thus transmitted by the gripper/feeler to the movable member in the drive system which is associated with this first gripper movement, and by its displacement the movable member operates the switch element which subsequently initiates a second gripper movement. The mechanical handling device according to the invention can have a number of efficient forms. For example, a gripper developed for swivelling motions could advantageously be connected with, or rather rotatably fixed to, a worm-wheel which engages with a motor-driven travelling worm, the latter being axially displaceable, a least in one direction, against an adjustable force so that the worm travels against this adjustable force when the actuating load directed against the gripper is high enough, the operating element which controls the switch being displaced at the same time. The adjustable force can be produced, for example, by a spring member in contact, at one side, with a fixed support and, on the other side, with a working face which is movable together with the movements of the worm. Or the adjustable force can be supplied by a piston through an associated piston rod. The movements of the travelling spiral or worm are preferably damped by means of a shock absorber.

According to an alternative arrangement, the swivelling motions of a gripper could be effected by connecting the gripper — again in a rotatably fixed manner — with a swivelling base to which a pivoted bolster is fixed, the bolster swivelling together with the base around the swival-axis of said base, and being rotatably fixed to a motor. Said swivelling bolster can be displaced against an adjustable force by a movement around its axis which extends parallel to the swivel-axis, wherein the drive shaft of the motor, which is coaxial with the bolster axis, is in frictional contact with a gear wheel which engages with a fixed gear wheel having preferably an internal toothing and serving as a bearing. When the actuating load is smaller than a given limiting value determined by the adjustable force, the driving gear wheel is caused to roll off on the fixed internal gear wheel, and this will cause both the bolster and the base to which the gripper is connected, to swivel. However, when the actuating load exceeds this limiting value, the driving gear wheel and the drive shaft become stationary while the motor, together with the bolster, revolve around the bolster axis, this rotational movement operating a switch-element and acting against the direction of the adjustable force. In other words, when a given actuating load acts on the gripper, the drive shaft ceases to revolve around the swivel-axis causing thereby the motor, and with this, the bolster to rotate in a direction which is opposed to the direction of the adjustable force when revolving around the drive axis. The adjustable force which acts on the pivoted bolster can be produced in a number of ways, for example by a suitable combination of piston and cylinder.

The linear gripper movements can be based on the gripper being connected with a threaded nut, the tapped hole being parallel with the direction of the linear movement, and the threaded portion of a spindle engaging with the threaded nut, the spindle being axially displaceable against an adjustable force, wherein a motor-driven gear wheel causes the spindle to rotate. It therefore moves in the axial direction against the adjustable force when the actuating load which affects the gripper is high enough, the switchelement being moved at the same time by an operating member. However, when the gripper collides with an object, the associated threaded nut ceases to travel along the spindle, and the latter moves through the threaded nut in a direction against an adjustable force. With vertical spindles, which correspond to linear gripper movements in the vertical direction, a loading member, say a spring, is advantageously used in an upward direction, to counteract the gravitational force. By this precaution the spindle can be protected against excessive gripper loads when the latter, together with the parts moving with it, travels downward at a speed where the force of inertia becomes immaterial. The loading member which acts on the spindle in an upward direction thus balances in a way the weight of the gripper including the parts which are loading the spindle together with the gripper. It follows that the spindle is affected by the resultant difference of forces, i.e. between the downward force due to the weight of the gripper including the parts which move with it, and the upward force exerted by the loading member. Since the loading member is adjustable, this force-difference is variable and corresponds to the adjustable force against which the spindle moves upwards as soon as the gripper rests on an object.

Alternatively, the linear gripper movements can be based on the gripper being connected with a motor-driven gear wheel whose drive axis extends at right angles to the gripper motion, the gear wheel engaging with a toothed rack which is adjustable in relation to an adjustable force, in its longitudinal direction. The rack will therefore move against the adjustable force when the actuating load directed against the gripper is sufficiently high, the operating member controlling the switch-element being moved at the same time. This arrangement is particularly effective when grippers have to perform vertical movements at great speed. With these vertical movements the forces of inertia play a considerable part, the gripper moving downwards, together with the parts which are connected with it, at a speed which is so great that the weight of these parts is almost compensated by the forces of inertia. In these circumstances the piston rod of a piston in a stationary cylinder can efficiently control the upper portion of the toothed rack: The piston rod forces the toothed rack downwards during the rapid downward movement of the gripper, whereby the total load resulting during this process, an adjustable force, which maintains the toothed rack in its correct position, is composed of the downward directed force-difference between the load exerted by the piston rod and the weight of the gripper including the parts moving with it, which is reduced by the effect of the forces of inertia. As pointed out above, this embodiment is favourable for rapid gripper motions. In practice, the gripper will be allowed to move towards the object it has to handle at a high speed until it approaches it rather closely, when the gripper movements will be slowed down in order to avoid the danger of destruction. The piston which forces the toothed rack downwards will therefore be under pressure during the first phase only, i.e. during the rapid downward movement of the gripper, while the pressure will be removed during the second phase when the gripper movement is delayed. The advantage of this arrangement is that sensitive objects are protected against damage which, in a system where pressure is applied to the piston during both the rapid and the delayed phases, would be inevitable, the downward load, composed of the gripper weight, the weight of the parts which move with the gripper, and the piston load, being so great that the toothed rack cannot move upwards before the actuating load directed agains the gripper reaches a very high value. When using the arrangement according to the present embodiment of the invention, however, the gripper moves initially at a high speed, this being the phase while the piston is loaded; when the gripper approaches a certain point in the vicinity of the loaded object, its movements are delayed by removing the pressure from the piston. In systems where the gripper is supported by an arm which is linearly and horizontally displaceable in a compound head, (the latter being flexibly supported by a pillar which is pivoted at an underframe, said compound head being capable of moving linearly in the vertical direction) it is advisable for at least the drive correlated with these vertical movements of the cross-head and the drive which is correlated with the rotational movments of the pillar, to comprise a moveable member which can be displaced against an adjustable force. Similarly, a drive comprising such a moveable member could advantageously be associated with the horizontal, linear, movement of the arm in the crosshead. When a handling device is equipped with these facilities, the gripper can be made to move in any of the spatial directions, wherein the distance covered in any particular direction depends solely on the activating load which is applied to the gripper. The arm holding the gripper could advantageously be telescopic in such a manner that the end of the arm which lies away from the gripper is stationary when the gripper moves towards the compound head. The space occupied by the mechanical handling device is thereby considerably reduced because there is no need for a swivelling-space to be kept free at this end of the arm. An additional advantage is gained with a system where a drive for one gripper movement contains a flexible member that is displaceable against an adjustable force, when this contains two individual switch-elements which, seen in the direction in which the movable member is displaced, are arranged in series, the first switch-element controlling the program for the gripper movements, and the second acting as a safety switch capable of disconnecting the handling device. The second switch-element will switch off automatically the mechanical handling device when the first switch-element which controls the gripper movements breaks down for whatever reason. This mechanical handling device is in fact completely self-contained, incorporating hydraulic and electric power systems; the only external source is a power line which leads into the handling device. In order to maintain the height of the underframe as small as possible, the hydraulic and electric supply units are conveniently accommodated inside the pillar or in a upper frame section connected with the pillar. The underframe merely houses the hydraulic and electrical connections to the drives contained in the underframe. The small height of the underframe enables the gripper to pick up objects from floor level of another very low position. The mechanical handling device discussed above ranges among the stationary devices. Its location is fixed. However, the layout is such that the handling device can be used as a mobile unit, since a special base, for example rails, can be incorporated into the system, which enable the entire mechanical handling device, i.e. the underframe and all other parts of the handling device, to be moved about, a drive incorporating a flexible member which can be displaced against an adjustable force and a switch-element being associated with the displacement of the handling device. A handling device having these characteristics is therefore capable of taking for example, components which are rough machined in a first machine-tool to a second machine tool located at some distance, to be finished there.

The description of the gripper itself is contained in the discussion of the accompanying drawings which follows below, to describe the invention in greater detail.

Figure 1:
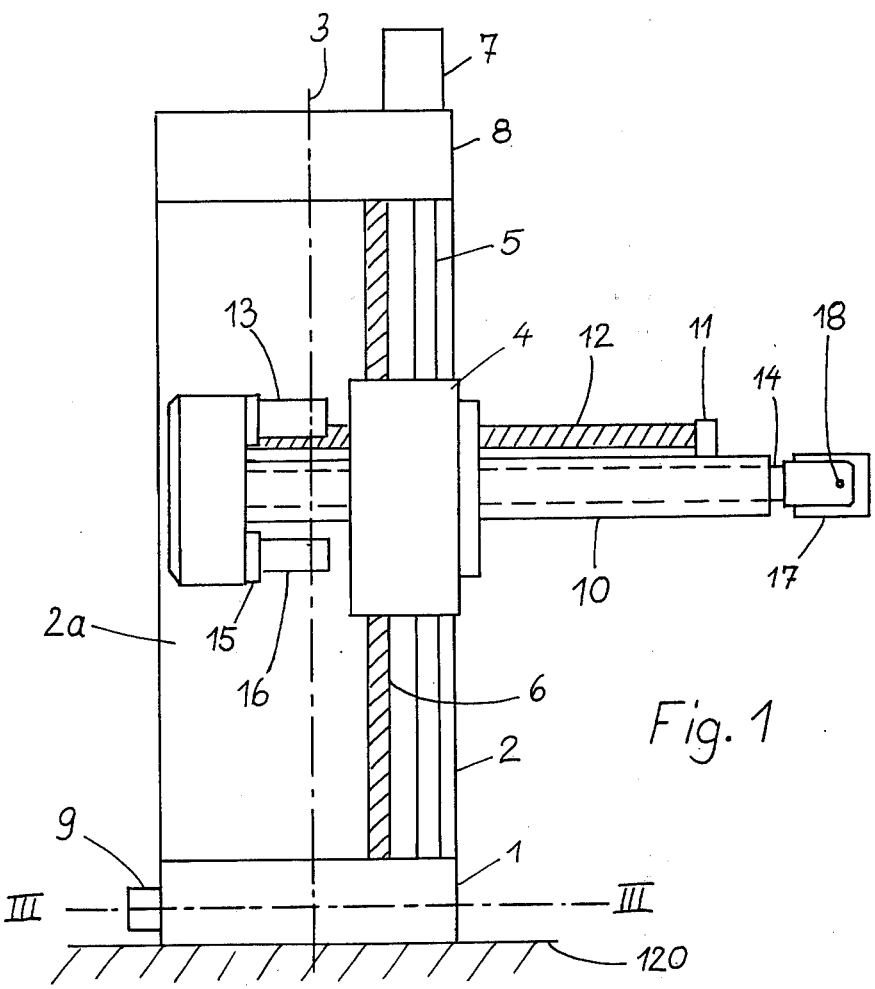
FIG. 1 shows a handling device in elevation, with one half of the pillar removed.
Figure 2:
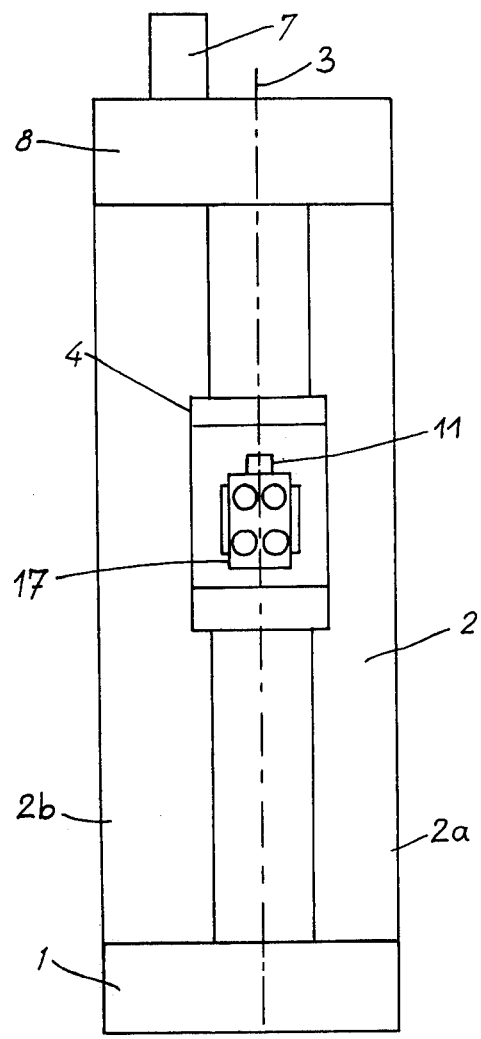
FIG. 2 is a front view of the handling device according to FIG. 1.

FIGS. 1 and 2 show the handling device is a front- and side elevation respectively. As underframe 1 supports a pivoted pillar 2 which may consist of two sections 2a, and 2b, a first motor 9 driving the pillar in rotational movement. The pillar 2 supports a compound head 4, which is vertically adjustable, parallel with the longitudinal axis 3 of the pillar. These adjustments are made by the aid of a guideway 5, such a guide-way being associated with each of the two sections 2a, 2b of the pillar, and by the aid of a cross-head spindle 6 which extends through a threaded nut (not shown in the drawings) which is connected with the cross head 4, the spindle being driven by a second motor 7 which is located at the upper frame member 8. The crosshead 4 carries an arm 10 which extends at right angles to the longitudinal axis 3 of the pillar 2, a spindle bearing 11 being fixed to the arm and supporting, rotatably, a spindle 12 which extends through a threaded bore in the cross-head 4, a third motor 13 causing it to revolve, whereby a rotational movement of the arm-spindle 12 displaces the arm 10 in the direction of is axis. A gripper tube 14, accommodated in a longitudinal bore through the arm 10, is connected at one end, with a fourth motor 16 through a coupling (clutch) 15 and, on the other side, with a gripper 17. With the clutch 15 thrown into gear, the gripper tube 14, and with it the gripper 17, can be caused to rotate whereas with the clutch 15 disengaged a torsional moment exerted on the gripper 17 makes the latter freely rotatable around its longitudinal axis. The gripper 17 is connected with the gripper tube 14 by a rotational shaft 18 which extends at right angles to the gripper tube axis. Thus the gripper 17 is able to perform a rotational movement around the longitudinal axis 3 of the pillar 2, and it can be vertically displaced along the pillar 2. In addition to this, the length of the pivoted arm can be varied, and the gripper can revolve around two of its axes. It is due to this great freedom of movement that the gripper can perform the most varied actions, the sequence of programmed operations being automatically controlled. The gripper itself acts as a transducer, and all information related to switching is transmitted by the gripper itself. Thus each time a resisting object induces into the gripper a given actuating load, the corresponding information is transmitted into a switch-element which initiates the next gripper movement. The information which announces that a given actuating force is directed against the gripper can be transmitted into the switch-element by a number of methods, as explained below. Since it is the gripper itself which picks up the information, the gripper can perform, not only a sequence of movements covering the same distance, but it can also move, without any external control, over paths whose lengths vary between very wide margins. The relevant factor for the distance which can be covered by the gripper is the fact that the gripper collides with a resisting object.

Figure 4:
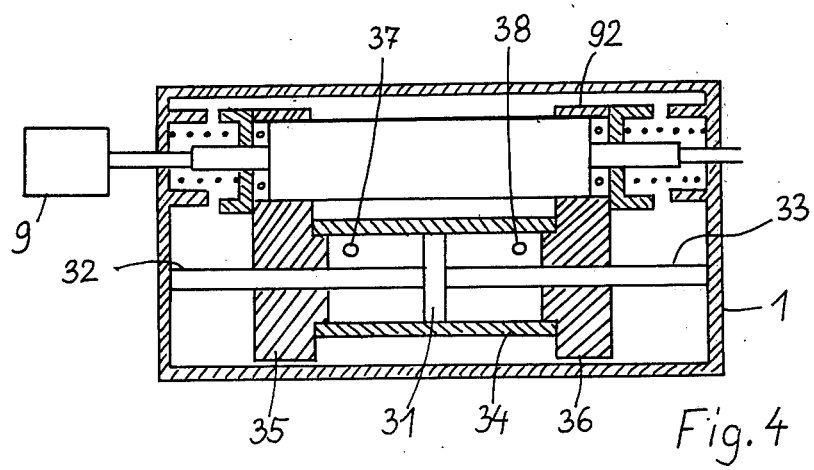
FIG. 4 is a section along line IV—IV in FIG. 3.
Figure 3:
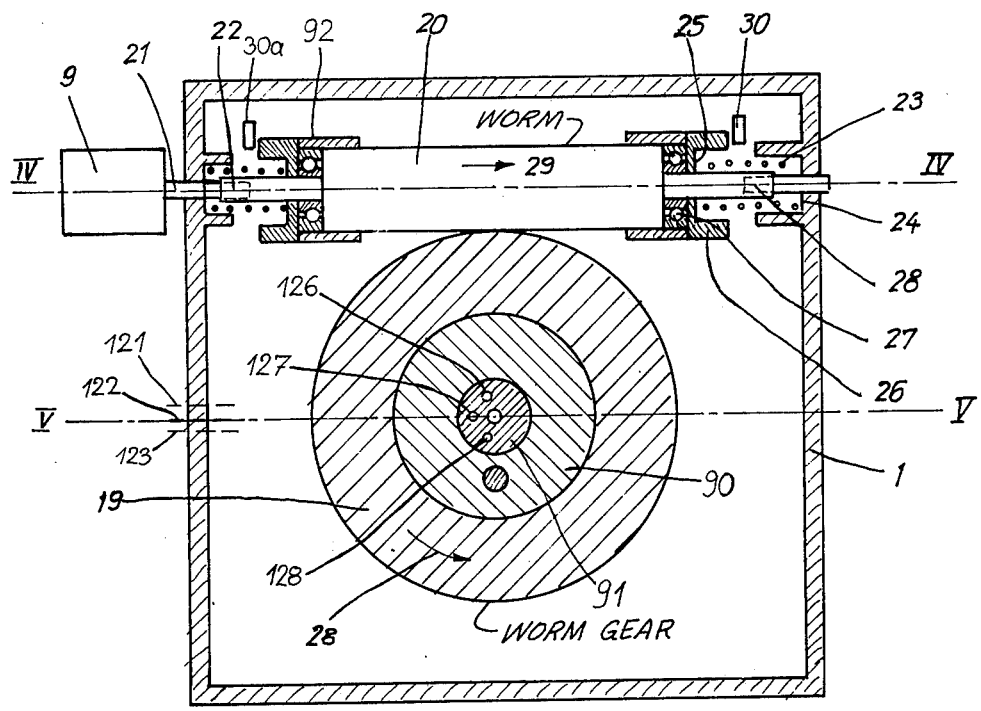
FIG. 3 is a section along line III—III in FIG. 1, of a first embodiment of a drive for swivelling motion.
Figure 5:
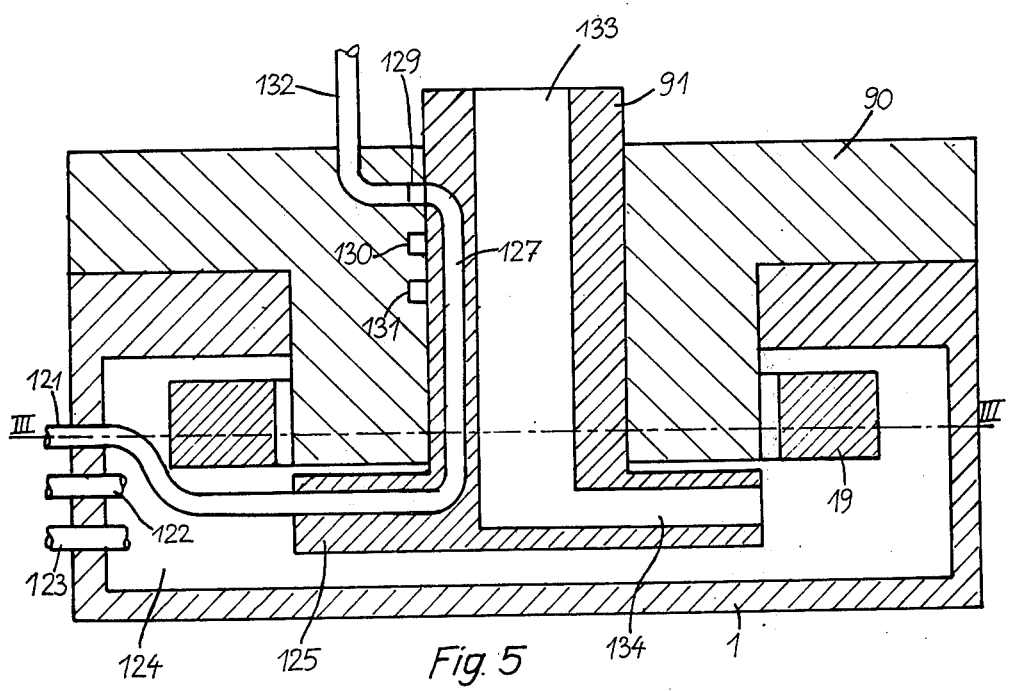
FIG. 5 is a section along line V — V in FIG. 3.

FIGS. 3 to 5 deal with the information concerning a gripper which collides with an object while swivelling around the longitudinal axis 3 of a pillar 3, describing the manner in which the information is processed in order to be transmitted to a switch-element 30 or 30a.

FIG. 3 shows an underframe 1 in section along line III—III in FIG. 1. A wormgear 19 pivoted in the underframe 1 is connected in a rotatably fixed manner with the pillar. As shown in FIG. 5, the worm-gear 19 is keyed on to a rotary table 90 which is pivoted in the underframe 1 and supports the pillar, which is not shown in the drawing. Together with the pillar it carries, the rotary table 90 revolves around a fixed shaft 91. The worm gear 19 may be driven through a travelling worm 20 which in turn is driven by the first motor 9. On one side the travelling spiral 20 is keyed on to the drive shaft 21 of the motor 9 through a cotter 22 and on its other side it is keyed on a fulcrum pin 28 which is pivoted on, and axially fixed to, the underframe 1. The travelling worm 20 is thus supported in an axially flexible manner, its instantaneous positions being fixed by coil springs 23. The adjustable force through which the travelling worm is retained in its correct position can alternatively be produced in a different manner using, for example, a suitable combination of piston and cylinder. The coil springs 23 are supported, on one side, against a stationary stopping surface 24 and, on the other side, against an adjustable working face 25 which can move along together with the travelling worm 20. The working face 25, in the embodiment shown as an example, is located on a sleeve 26, which is rotatable around a travelling helix, the sleeve end lying away from the coil spring 23 being rotatable in relation to a step in the worm, a ball bearing 27 being used as an intermediate member.

The travelling spiral 20 thus is maintained in its central position by adjustable forces acting at either end. In this position, the worm 20 causes the worm wheel 19 and consequently also the pillar, to rotate as soon as the motor 9 is switched on. When the gripper, which revolves together with the pillar, collides with a resistance, the travelling worm 20, reacting to an actuating load which is induced into the gripper through the spring load of the coil spring 23, ceases to drive the worm-wheel 19; instead, the travelling worm 20 moves in an axial direction against the adjustable spring load. When the worm-wheel revolves in accordance with arrow 28 for example, the worm 20, reacting to a given actuating load exerted and affecting the gripper, will move towards the right hand side as indicated by arrow 29. When the worm-wheel 19 revolves in the opposite sense, the worm 20 is caused to move in the opposite direction. The movements of the worm cause a switch-element, 30 or 30a, to react and control the programmed sequence of operations. There are, in fact, two parts which move in relation to one another, namely the worm-wheel 19, and the worm 20. The worm or travelling spiral will perform its axial movements, and the worm-wheel will be stationary, when the torsional moment produced by the travelling worm, in order to make the worm-wheel revolve, is so great that the spring load in the springs 30 cannot maintain the worm in its central position; the travelling worm travels in this case past the worm-wheel, the two threads being engaged.

FIG. 4, which is a section along line IV—IV in FIG. 3, shows how the axial movements of the travelling worm can be damped by means of a shock absorber. This shock absorber incorporates a piston 31 to which power can be admitted from either end; this corresponds to the two opposed directions in which the travelling worm moves. The piston is rigidly supported, the two piston rods 32, 33 being fixed to the underframe 1. In addition, the shock absorber comprises a damping cylinder 34 which extends parallel to the travelling spiral 20, the two cylinder covers 35, 36, being in frictional contact with the travelling worm, in the axial direction; this contact is made through an annular part 92 at either end, which ensures that the rotational freedom is available. Each of the two annular members 92 surrounds the travelling worm and rests at the same time, at one of the axial ends, against the bottom of a sleeve 26. The two pressure chambers located between the two covers and the piston ends receive the two pressure lines, one of them opening into one of the pressure chambers, and the second into the other pressure chamber and both comprising a restricting zone 37, 38 respectively. When the travelling worm and consequently the damping cylinder 34 move, say, towards the right hand side, the pressure medium in the right hand side pressure chamber is displaced and the movement of the travelling worm is correspondingly damped.

Figure 6:
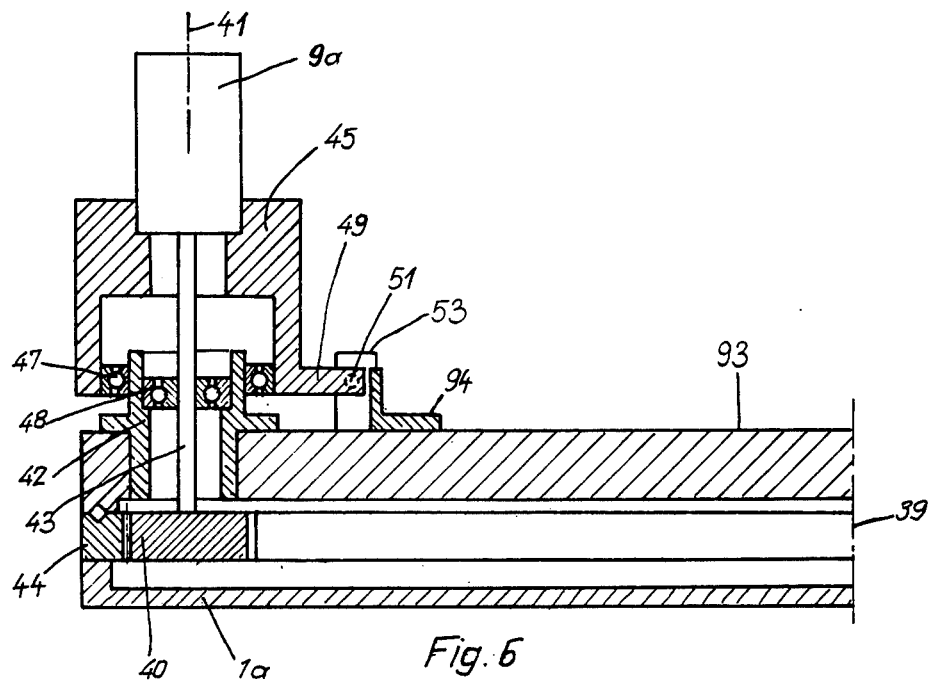
FIG. 6 is a section along line VI—VI in FIG. 7, which is a second embodiment of a drive for swivelling motions.
Figure 7:
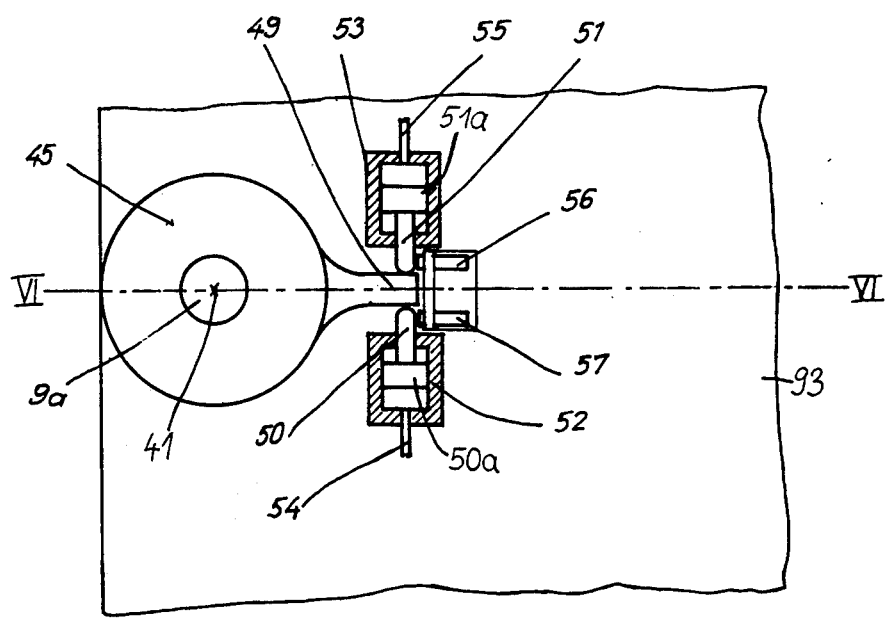
FIG. 7 is a plan showing the second embodiment according to FIG. 6.

Another way by which to transmit the information that the gripper, swivelling around the longitudinal axis 3 of the pillar 2 has met with resistance, is shown in FIGS. 6 and 7 at an apex-element. FIG. 6 shows, in cross-section, a swivel-base 93 with a swivelling shaft 39. The pillar, which is not shown in this illustration, is rigidly fixed to the swivel-base 93, and any rotational movements of the base 93 consequently entail a rotation of the pillar. The swivel-base 93 is furthermore coaxially rotatable in relation to a fixed bearing 44. The fixed bearing shown in FIG. 6 is an internal gear wheel. However, an external gear wheel would be equally suitable for this purpose. The fixed bearing 44 is rigidly mounted on the underframe 1a. A pivoted bolster 45, fixed to the swivel-base 93, is rotationally fixed to a motor 9a. Th drive-shaft 43 of this motor extends through an opening in the swivel-base 93, and supports a gear wheel which engages with the internal gear bearing 44. The drive-shaft 43 is supported on the swivel-base 93 — through a ball bearing 48 and a special insert 42 — in such a manner that it can rotate around the bolster axis 41.

A further ball bearing 47 between the pivoted bolster 45 and the insert 42 enables both the pivoted bolster 45 and its associated motor 9a, to rotate likewise around the bolster axis 41. The pivoted bolster 45 is provided with a lug 49 on which two piston rods 50, 51, can act in directions parallel to the swivel base, the longitudinal axes of the piston rods extending in the swivelling directions. These piston rods 50, 51, are connected with corresponding pistons 50a and 51a, which are flexibly controlled by two cylinders 52 and 53 respectively, which are fixed to the swivel-base 93.

The pistons 50a and 51a are provided with pressure pipes 54 and 55 respectively, through which they can be put under pressure. The lug 49 is associated with two switchelements 56, 57, which are supported in a holding device 94. The functions of the embodiment according to FIGS. 6 and 7 are described as follows.

When the gripper is allowed to revolve freely so that the pillar and the swivel-base can also revolve; that is to say, when no obstacle acts against the swivelling movements of the gripper, the motor 9a will drive the driving shaft 43 and thus the driving gear wheel 40, the circumference of which rolls off along the teeth of the stationary gear wheel 44. The driving shaft 43, and the driving gear wheel 40 therefore rotate around their own axes, i.e. around the pivoted bolster axis 41, and also around the swivel-axis 39. The pivoted bolster 45, together with the motor 9a which is rotatably fixed in relation to the bolster, however, revolve only around the swivel-axis 39 but not around the bolster axis 41, the bolster being prevented from revolving around its own axis by the adjustable load exerted by the piston rods 50 and 51. When the torsional moment which has to be supplied by the drive shaft 43 in order to let the swivel-base revolve reaches a given value determined by the adjustable force — which occurs when an activating load is induced into the gripper — the two piston rods 51, 51, which exert a torsional moment on the pivoted bolster 45 which is opposed to the torsional moment induced by the drive shaft 43 into the bolster, the rods can no longer retain the lug 49 in its central position, and the pivoted bolster 45 can rotate around the bolster axis 41, whereby, depending on the rotational direction, either the switch-element 56 or the switch-element 57 will be operated, and initiate the next movement of the gripper. Alternatively, the functions of the embodiment of the invention discussed herewith could also be explained by an actuating force which affects the gripper and has a retarding effect on the rotational movement of the swivel-base 93, locking the drive-shaft 43 completely when the actuating load is sufficiently high. When this occurs, the drive shaft no longer revolves, and the motor no longer remains stationary; instead, the drive-shaft is stationary, and the motor revolves around the stationary shaft, the motor revolutions and the revolutions of the bolster which is rotationally fixed to the motor being dependent on the adjustable force of the piston rods 50 and 51. Obviously, the force acting on the lug 49 need not be supplied by a piston/cylinder arrangement as shown in the illustration; any source of an adjustable load, say springs, could be used equally successfully. The drive described above is readily accessible from the outside.

So far, FIGS. 3 to 7 have been discussed. In these figures, the pillar contained in FIGS. 1 and 2, is not shown. Similarly, FIGS. 3 to 7 do not show either the arm 10 or the gripper 17. This has been done intentionally, because the systems (examples) described up to now are not restricted in their application to driving of a pillar connected with a gripper through an arm; the drives described above could produce any other form of gripper rotation. For example, the gripper tube 14 could be caused to revolve, together with the gripper 17, around a common axis. In this case, the end of the gripper tube 14, which is away from the gripper, has to be mounted on the swivel-base 93 or on the worm wheel 19. It follows that, depending on requirements and on the type of handling device, the swivel-drives described above can made the gripper perform any feasible swivelling or rotational movement, the only condition being that the drive for the rotational or swivelling gripper motions incorporates a displaceable member which is moved against a given adjustable load which affects the gripper, said displaceable member thereby operating a switch-element which controls the programmed gripper movements.

Figure 8:
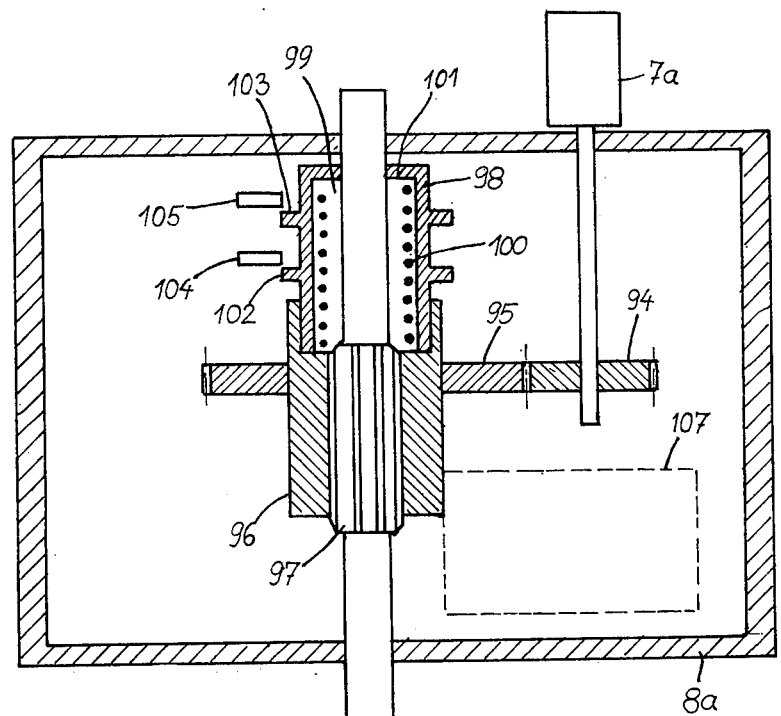
FIG. 8 is a section illustrating a first embodiment of a drive for linear movement.

FIG. 8 shows in a schematic section the transmission of an actuating force, acting against a linear gripper movement, into a switch-element. A motor 7a drives a drive gear wheel 94 which engages with a driven gear wheel 95. This driven gear wheel 95 is keyed on a supporting sleeve 96 which is fixed in the axial direction. The carrier sleeve 96 in turn is keyed on a spindle 97 which corresponds to the compound-head spindle 6 depicted in the first discussed embodiment of the invention, in FIGS. 1 and 2. Above the carrier-sleeve 96, the spindle 97 is provided with another sleeve 98 which opens towards the sleeve 96. Together with the spindle, the inner wall of the second sleeve 98 constitutes an annular space 99 in which a spring 100 rests, at one end, against the closed end-face 101 of the sleeve 98, the other end being supported at the carrier sleeve 96. The unit formed by the spindle 97 and sleeve 98 is axially adjustable in the direction towards the carrier sleeve 96. The sleeve 98 has two projections 102 and 103 with which are associated two switch-elements, 104 and 105 respectively. All parts enumerated so far can be accommodated, in the embodiment according to FIG. 8, in the upper frame section 8a which corresponds to the upper frame member 8 shown in FIGS. 1 and 2. The spindle 97 extends through the underside of the upper frame 8a and through a threaded nut 106 which is mounted in a compound head 10a which is shown in a broken line sketch in FIG. 8. When the motor 7a is energized, the carrier sleeve 96 is caused to revolve, and this sleeve makes the spindle 96 turn round and consequently the cross head 10 and with it the gripper, are vertically adjusted. When the cross head 10a moves downward and is met by a resisting object, the cross head 10a stops moving, and the spindle 97 together with the sleeve 98 move upwards, the spindle engaging with the thread of the threaded nut 106. Consequently the projection 102 activates the switch-element 104, controlling thereby the programmed sequence of movements. If the switch-element 104 breaks down for whatever reason, the projection 103 operates the switch-element 105 which serves as a safety-switch, disconnecting the mechanical handling device. In the case of the illustrated embodiment the spring 100 exerts a force in the direction in which the spindle 97 is moved. The reason for this is that the spindle 97 is not affected by the load of the spring alone, but also by the weight of the cross-head 10a plus arm and gripper. The total, adjustable, load which acts on the spindle is therefore not equal to the spring load but it is equal to the difference between the weight of the cross-head and the spring force, whereby this difference is directed downwards in the direction of the gravitational force, and therefore opposes the motion of the displaced spindle 97, provided the cross-head has the right weight. In other words, when an actuating force directed against the gripper from below reaches the value of the difference between the weight of the cross-head with its associated parts and the spring force, the cross-head ceases to move downwards, the spindle 97 moving against the direction of the adjustable difference-load in the upward direction, and operating the switching-element. The difference-load is adjustable because in contains the variable spring load. By keeping the adjustable force, i.e. the difference-force, sufficiently low, which means that the spring force has to be correspondingly high, the mechanical handling device can be used, for example, for piling fragile objects such as glassware, in stack-form, because the gripper can react to a very small actuating force, so that the spindle moves upwards, performing the next motion. FIG. 8 shows a further detail. It contains in schematic presentation, a safety brake device 107 which arrests the carrier-sleeve when the cross-head stops moving. The purpose of this safety device 107 is to prevent the cross-head 10a from accidentally moving downwards under the effect of the gravitational load, because this would twist the spindle 97 together with the parts which are rotationally fixed to it. When the cross-head is moved downwards at a speed so high that the cross-head weight is small in relation to the evolving forces of inertia or even smaller than the forces of inertia, it is necessary to modify the embodiment which has just been described, because a force must be applied to the spindle in the direction of the gravitational force so as to ensure that the adjustable, resultant, force-difference between the weight of the gripper including the parts which are moving together with the gripper, and the variable spring force acts once more downwards, that is to say against the direction in which the spindle 97 moves. Needless to say, the spring force could be replaced by another variable force.

Figure 10:
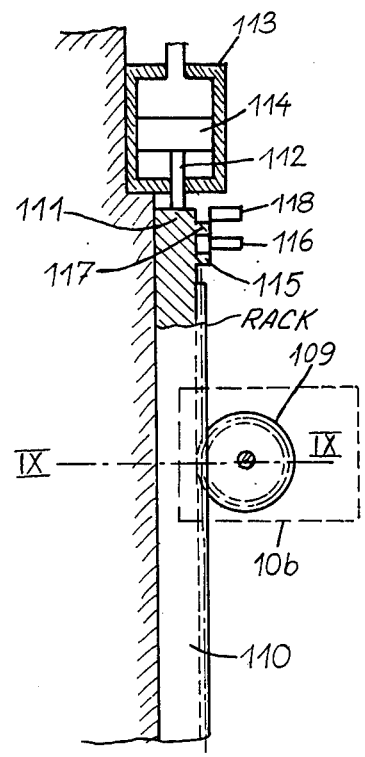
FIG. 10 is a section along line X—X in FIG. 9.
Figure 9:
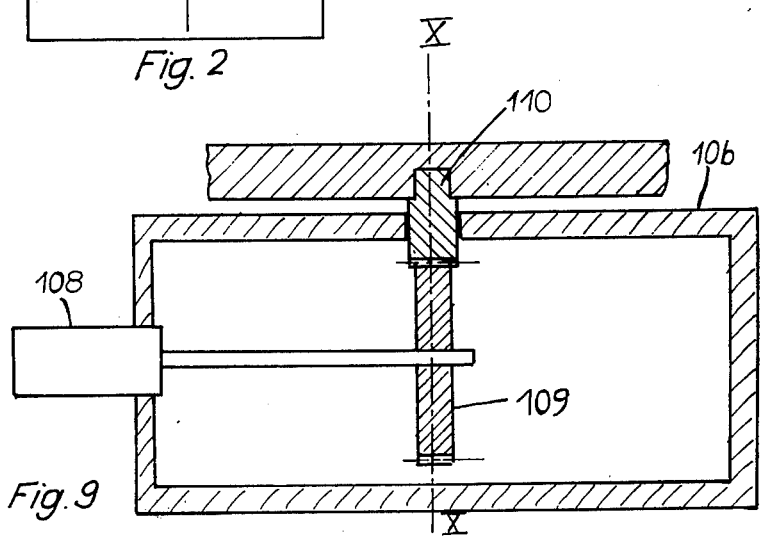
FIG. 9 is a section along line IX—IX in FIG. 10, which is a second embodiment of a drive for linear movement.

An alternative possibility for a drive for linear gripper movements, again comprising a displaceable member which can move against an adjustable force, is shown in FIGS. 9 and 10. Again, the gripper is connected with a cross-head 10b which is vertically adjustable. A motor 108, fixed to the cross-head 10b, drives a driving gear wheel 109 which engages with a toothed rack 110 which extends vertically along the pillar of the handling device. The rod 112 of a piston 114 in a cylinder 113 which is fixed to the pillar, acts on the upper portion 11 of a toothed rack 110. The admission of pressure to the piston 114 is variable. Again, the adjustable force which acts upon the displaceable member (in this case it is the toothed rack 110), and against which the latter has to move when the gripper collides with a resisting object, is equal to the force resulting from the gravitational force of the cross-head 10b and the weight of the parts which are moving with it, and the force exerted by the piston rod 112 on the toothed rack 110. With this arrangement, the upper piston end is under pressure when the cross-head has to move downwards at a great speed, that is to say, when — as pointed out before — the weight of the cross-head including that of all parts moving with it, is practically compensated, while no pressure is admitted to the piston end when the cross-head 10b moves slowly downwards. In cases where the gripper has to cover a long, vertical, distance, the cross-head is allowed to travel initially very fast downwards, to save time, and in this case pressure is admitted to the piston 114. When the cross-head reaches the vicinity of its end position, the speed is reduced, the pressure being at the same time removed from the piston 114, bearing in mind that the toothed rack 110 would, otherwise, not start moving upwards before the actuating force which controls the gripper is great enough for the gripper to destroy the object with which it was in collision. The upward movement of the toothed rack 110 causes a first projection 115 to operate a switch-element 116 which controls the sequence of the programmed movements. In the case of breakdown of this switch-element 116, a second projection 117 operates a switch-element 118 which, being a safety switch, disconnects the handling device.

It is easy to see that the drives discussed above are not exclusively drives for linear gripper movements in the vertical direction. They are equally suitable for linear movements in the horizontal direction. The necessary modifications are simple. For example, the direction of the spring-force acting, in the example shown in FIG. 8, upon the carrier sleeve 96, is reversed, since the force of gravitation is immaterial for horizontal movements. It is therefore possible to use a drive corresponding to any of the drives according to FIGS. 8 to 10 with the horizontal linear movement of the arm in the compound head.

Figure 11:
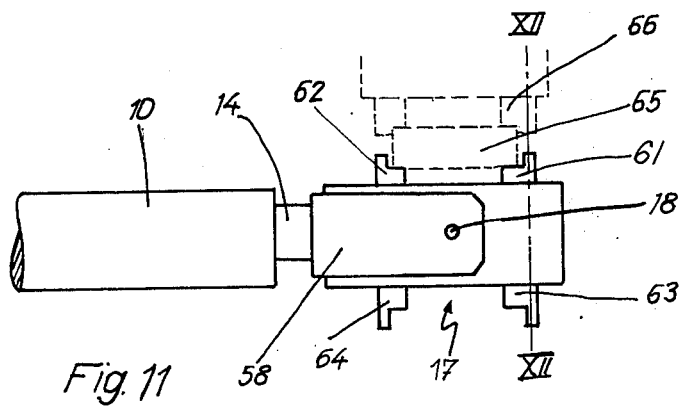
FIG. 11 shows the gripper from above in a plan.
Figure 12:
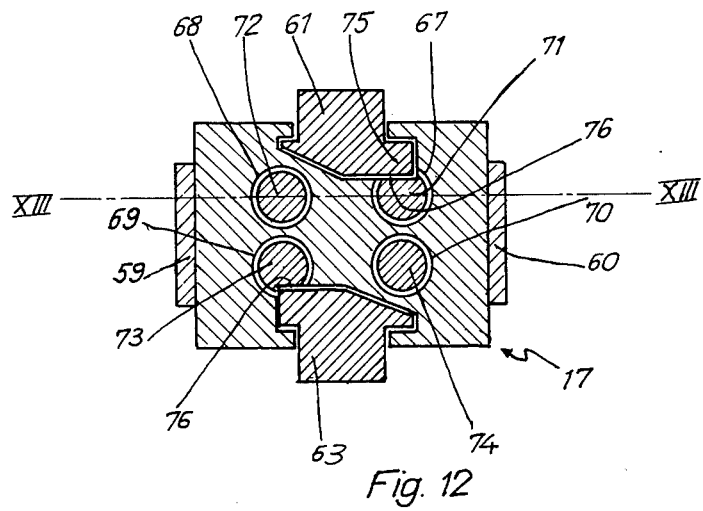
FIG. 12 is a section along line XII—XII in FIG. 11.
Figure 13:
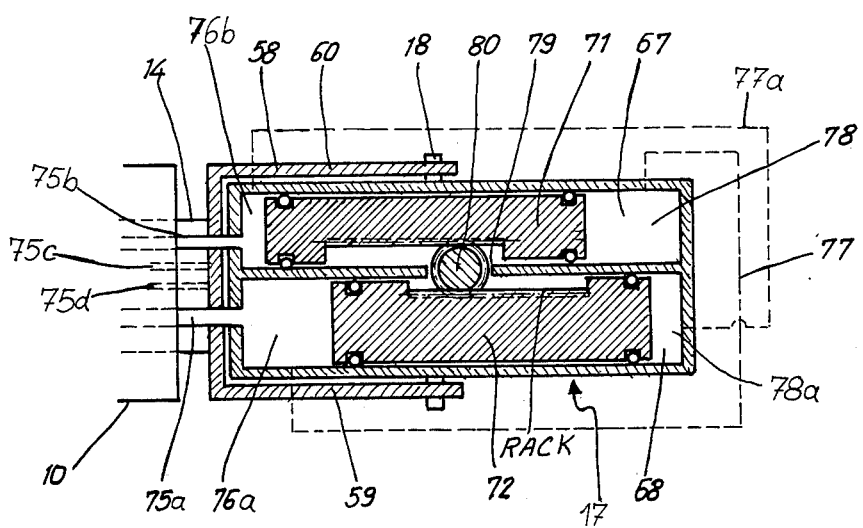
FIG. 13 is a section along line XIII—XIII in FIG. 12.

The structural features of the gripper are shown in FIGS. 11 to 13, FIG. 11 shows, in analogy with FIG. 1, an arm 10 which encloses a gripper tube 14. The front end of the gripper tube 14 is provided with a link 58 of U-shaped cross-section (see also FIG. 9), the cross-member of which is used for mounting, and the two legs of the U embrace the gripper 17 like butt straps 59, 60. The gripper 17, being suspended from these straps 59, 60, is freely rotatable around the axis 18.

The gripper comprises a number of jaws. In the example shown in the drawing, it has four jaws 61, 62, 63, 64, each of them accommodated in a flat-track. These jaws are used in pairs composed of jaws 61 and 62, and 63 and 64 respectively, the jaws in each pair being correlated with each other to be able to move jointly towards one another and away from each other. As indicated schematically in FIG. 11, a pair of jaws, e.g. 61, 62, can serve for example as a holding device for a component 65 which has to be inserted into, or taken out of, the jaw-chuck 66 of a machine tool. The movement of the jaws is effected my means of associated pistons 71 or 72 or 73 or 74 housed in cylinder bores 67, or 68 or 69 or 70 in the gripper. For example, a projection 75 on the jaw 61 which corresponds to piston 71, engages with a recess 76 in this piston, and the jaw consequently follows the movements of the piston 71. According to FIG. 13 the two jaws 61 and 62 are caused to approach one another, the corresponding pistons 71 and 72 moving in opposite directions. A pressure line 75a, which otherwise would be accommodated in the gripper tube 14, leads into a cylinder bore 68, in its end section 76a which is adjacent to the arm 10, this end section 76a being connected, through a schematically shown connecting line 77, with the opposite end section 78 of the cylinder bore 67 which is adjacent to the cylinder bore 68. Correspondingly, a pressure line 75b leads into the end section 76b of a cylinder bore 67, which faces the arm 10, this end section 76b being connected, through a connecting line 77a, with the opposite end section 78 of the cylinder bore 68 which is adjacent to the bore 67. The same conditions apply to the pair of pistons 73,74, pressure lines 75c and 75d which are schematically shown on the drawing, being associated with the pistons 73 and 74. When the pressure medium is admitted, for example, into the end section 76a through the pressure line 75a it will also reach the end section 78 through the connecting line 77 and the piston 72 will therefore move towards the right hand side, while piston 71 moves at the same time towards the left hand side. Since the two pistons 71 and 72 are connected with the jaws 61 and 62, the jaws will move towards each other, gripping the component. Correspondingly the jaws 61 and 62 are opened when the pressure medium is admitted through the pressure line 75b. The two pistons 71 and 72 are coupled not only pneumatically or hydraulically but also mechanically, the wall section between the two cylinder bores 67 and 68 being provided with an opening 79 for the accommodation of a pivoted toothed wheel 80 which engages with the two middle portions of the pistons, these being designed as toothed racks. The purpose of this mechanical connection between the two pistons 71 and 72 is to ensure that the pistons move uniformly towards one another. Since the gripper is fully symmetrical, the conditions discussed in connection with the pair of pistons 71 and 72 apply also to the gripper zone which accommodates the other pair of pistons 73 and 74.

Since the two pairs of jaws can be used independently of each other and since the gripper tube 14 is rotatable, by means of a motor 16 (FIG. 1) around its longitudinal axis, the gripper is capable of performing the most varied movements. For example:

The pair of jaws 63, 64 picks up an unfinished component from, say, a stack, the gripper having approached the stack under the control of the drives described in FIGS. 1 to 10. The gripper is subsequently moved into a position opposite the jaw-chuck of a finishing machine; however, this jaw-chuck is occupied by another, finished, component. The gripper is therefore caused to revolve around the axis of the gripper tube, until the free pair of jaws 61, 62 come to lie opposite the finished component. Now the clutch 15 is disengaged (FIG. 1) so that the pair of jaws 61, 62, can freely approach the finished component, and embrace it. At this stage, pressure is introduced into the pressure line 75, causing the jaws 61 and 62 to move towards each other until they firmly grip the finished component. Having opened the jaw-chuck on the finishing machine, the gripper is slightly swivelled away from the jaw-chuck, the clutch is engaged once more, and the gripper is made to revolve through 180° so that the two other jaws, 63 and 64, holding between them the unfinished component, are in a position opposite the jaw-chuck. Now the gripper tube is disconnected from the motor 16, and the unfinished component is inserted into the jaw-chuck.

The pressure medium is removed through the pressure line 74 either prior to or after the jaw-chuck has been tightened. This causes the pair of jaws 63 and 64 to release the unfinished component. The gripper, with the finished component between the jaws 61 and 62, now moves to a store for finished parts, where the finished component is taken out of the pair of jaws 61, 62. The sequence of the various gripper motions is controlled by the switch-elements discussed when explaining the drawings. Through their actions the handling device is fully automatically controlled.

To accomplish the horizontal gripper movements, the arm 10 used with the handling device according to FIGS. 1 and 2, is displaced by the full axial length in the cross-head 4. The arm-end which is away from the gripper thereby moves away from the pillar 2, when the gripper is moving towards it. In such conditions it is obviously necessary that a certain space must be kept clear at the handling device to enable the end of the arm 10 which is adjacent to the motor to move out of the system and away from the cross-head. According to an alternative embodiment of the invention, which is not shown in the drawings, a telescopic arm is used which permits the end away from the gripper to be fixed, while the end adjacent to the gripper is axially adjustable. This system does not entail special space requirements in the zone of the arm-end which is away from the gripper when the latter is moved towards the pillar, and this end of the handling device can therefore be moved very closely to other objects such as, say, a machine tool.

A further, alternative, form of the handling device has been developed which is not shown in the drawings because it is easy to visualize its functions.

This alternative handling device incorporates a base, for example the base 120 according to FIG. 1, upon which the underframe 1 and other parts of the handling device can be arranged in a flexible manner. This base can consist, say, of rails, and comprise in the drive for the movements against an adjustable force, a displaceable member. The information concerning the presence of an actuating load which acts upon the gripper can therefore be transmitted as before into the switch-element corresponding to the displacement of the movable member in the drive.

The handling device constitutes in fact a closed unit. That is to say that it comprises all hydraulic and electric supply systems it requires, excepting an external electrical power line which, fixed at one end to the handling device, has to be connected with the mains to make the mechanical handling device operable. In other words, when excepting this power lead, the handling device may be regarded as a self-supporting system. The electric and hydraulic units are accommodated in the pillar 2 and or in the upper frame 8. The height of the underframe 1, which therefore has to house no space-consuming elements but merely accommodates the electrical leads and the hydraulic lines leading to the devices in the underframe 1, is correspondingly small. This permits the arm to be moved down to a very low level, and the gripper can therefore pick up, without additional aids, the objects from the floor. FIG. 5, presenting the underframe according to FIGS. 3 and 4, shows how the hydraulic and electrical lines can be accommodated in the underframe. As explained above, a rotary table 90 revolves around the fixed shaft 91. The pillar 2 is rotatably fixed to the rotary table. This rotary table 90 is driven by means of a worm-wheel 19 which may be keyed on to the rotary table. The three hydraulic lines 121, 122, 123, which are associated with the motor 9 and are schematically indicated in FIG. 3, extend jointly from the motor 9, where they start as individual lines, into a cavity 124 in the underframe 1 and thence radially through a flange-like extension 125 of the fixed shaft 91, and axially through the fixed shaft itself, the sections inside the shaft 91 consisting of three bores 126, 127, and 128. Each of the three bores 126, 127, and 128 opens into a corresponding annular channel 129, 130 and 131 at the rotary table 90, and lead into the pillar 2 (for example, the line 132 extends from the annular channel 129), to connect with the hydraulic supply units. The electric lines, leading say, to the switch-elements 30, 30a in the underframe (see FIG. 3) extend through the central axial bore 133 and the radial bore 134 which branches off the central bore in a radial direction. As shown in FIG. 5, the height of the underframe can indeed be very small.

It follows from the above that the new handling device which allows the gripper movements to be controlled in a force-dependent manner instead of using the previous, distance-dependent system, is free from the drawbacks of the known mechanical handling devices. For example, when using the previous systems with, say, roughly finished parts which had to be inserted one after the other into the jaw-chuck of a machine tool, it was necessary to ensure that all parts had exactly the same dimensions. In practice, this is never the case. Even partly finished components which are considered to be identical, differ slightly one from the other, and the distance covered by a pre-set gripper may therefore be too short in one case, and too long in another. This means, however, that the parts handled by the gripper cannot be fixed in the jaw-chuck at identical fixing positions, and the final dimensions of the finished objects will vary correspondingly. Similarly, when using one of the previous handling devices, the jaw-chuck of the machine tool, or the component which is inserted into it, can easily be damaged when the path length of the gripper is too long, or when a component is smaller than it should be and is forced between the jaws of the chuck. This danger, which results from the fact that the distance covered by the gripper is pre-determined by the pre-adjustment of the gripper when using any of the known handling devices, does not occur when operating with the new handling device.

I claim:

1. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, the actuating force acting on said gripper being transmitted by said gripper to said member in the drive associated with the first gripper movement causing said member to be displaced and actuate said switch means to initiate a second gripper movement.

2. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, said displaceable force transmitting member is a worm and movement of said worm is damped by means of a shock-absorber.

3. A handling device according to claim 2, wherein the shock-absorber comprises a damping cylinder which extends parallel to the worm, and is equipped at its ends with covers, the damping cylinder being in frictinal contact with the worm in the axial direction, while in the rotational direction it is connected with the worm in a rotationally free manner, and comprises furthermore a piston which is fixedly mounted inside the damping cylinder and to which pressure can be admitted from either side, a pressure pipe with a restricting zone leading into each of the pressure chambers of the shock absorber.

4. A handling device according to claim 3, wherein the piston connects at either end with a piston rod, the rods extending through the covers and being supported in a stationary manner.

5. A handling device according to claim 3 wherein each of the two covers of the damping cylinder comprises an annular extension which freely rotates around the worm and rests with one of its axial ends against the bottom of the sleeve.

6. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, said gripper connecting with a swivel-base so that it may perform a swivelling movement, a pivoted bolster being fixed to said swivel-base and swivelling together with the swivel-base around the swivel axis of the latter, and connected with a motor in a rotatably fixed manner, said displaceable force transmitting member being a bolster displaceable around a bolster shaft against said adjustable force, said shaft extending parallel with said swivel axis and the drive shaft of said motor which is coaxial with the bolster shaft being in frictional contact with a driving gear wheel engaging with a fixed bearing, whereby when said actuating force which acts upon the gripper is smaller than said adjustable force, said driving gear wheel rolls on said fixed bearing thereby swivelling both said pivoted bolster and said swivel-base to which said gripper is fixed, while with an actuating force greater than said adjustable force, both said driving gear wheel and said driving shaft are stationary and said motor, together with said pivoted bolster, rotates around said bolster shaft in a direction opposed to said adjustable force, and said switch means being operated by said rotational movement.

7. A handling device according to claim 6 wherein the fixed bearing comprises a toothing.

8. A handling device according to claim 6 wherein the adjustable force is induced into the pivoted bolster from two opposite directions, through two piston rods, each of them being connected with a piston which is flexibly supported in a corresponding cylinder fixed to the swivel-base.

9. A handling device according to claim 6 wherein the pivoted bolster comprises a lug which projects in a direction perpendicular to the bolster shaft, two switch-elements being correlated to said lug and connected with the swivel-base, these switch elements being symmetrically arranged in relation to a plane defined by the bolster axis and the swivel axis.

10. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, said gripper connecting with a threaded nut to provide a linear movement, said threaded nut having a bore extending parallel to the direction of said linear movement and engaging with the threaded portion of a spindle constituting said displaceable member and which is axially displaceable against said adjustable force, said spindle being rotatable by means of a driving gear wheel driven by a motor whereby when said actuating force acting on said gripper is greater than said adjustable force, said spindle is axially displaced against said adjustable force, and said switch means being actuated together with said spindle.

11. A handling device according to claim 10 wherein the driving gear wheel engages with a driven gear wheel which is keyed on to a carrier sleeve which is fixed in the axial direction and whose internal bore is connected with the spindle in a rotatably fixed manner.

12. A handling device according to claim 10 including a force-element which acts upon the spindle against the direction of the gravitational force, i.e. in an upward direction, when the spindle is vertically arranged.

13. A handling device according to claim 12, wherein a second sleeve which is in frictional contact with the spindle in the axial direction, surrounds the spindle above the carrier sleeve, a spring resting against the closed end of the sleeve, which is remote from the carrier sleeve, the other end of the spring acting upon the axially fixed carrier sleeve.

14. A handling device according to claim 13 wherein the sleeve comprises at least one lug which projects sideways and is correlated to a switch-element.

15. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, said gripper connecting with a driving gear wheel driven by a motor to perform a linear movement, the drive shaft of said gear wheel extending at right angles to the direction of the movements of said gripper, and said gear wheel engaging with a toothed rack constituting said displaceable force transmitting member and being displaceable in a longitudinal direction against said adjustable force whereby when said actuating force acting upon the gripper is greater than said adjustable force, said toothed rack is displaced against said adjustable force, said switch means being actuated together with said toothed rack, and further comprising a piston rod with a piston located in a fixed cylinder which acts upon the upper portion of said toothed rack in a system where said toothed rack is mounted vertically.

16. A handling device according to claim 15, wherein pressure is admitted from above to the piston while the gripper together with the parts which are connected with it, moves rapidly downwards, that is to say when their weight is small because of the forces of inertia which act in the opposite direction, while no pressure is admitted to the piston when the gripper including the parts which are connected with it, moves slowly downwards.

17. A handling device according to claim 15 wherein the toothed rack comprises at least one lug which projects in a direction perpendicular to its longitudinal axis and with which is associated a switch-element.

18. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, said gripper comprising a number of jaws which are flexibly supported thereon and capable of gripping components, a piston in a cylinder bore and the gripper being associated with each of said jaws whereby the individual jaws can be displaced when pressure is admitted to the corresponding piston, at least one pair of said jaws consisting of two jaws which are movable towards each other or away from each other, and being supported on said gripper, said two jaws engaging through a projection inside the gripper which engages with a recess in the corresponding piston.

19. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, said gripper comprising a number of jaws fixedly supported thereon and capable of gripping components, a piston in a cylinder bore and said gripper being associated with each of said jaws whereby the individual jaws can be displaced when pressure is admitted to the corresponding piston, each of said cylinder bores housing one of said pistons connected with a respective jaw, the axial end sections being remote relative to each other and belong to two cylinder bores corresponding to a pair of jaws being interconnected through a connecting line whereby said two jaws are caused to move towards each other when pressure is admitted to one of said two end sections, the wall section separating the cylinder bores corresponding to a pair of jaws including an opening in which a gear wheel is pivoted engaging with the middle sections of the two pistons which are designed as toothed racks.

20. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of the member against said adjustable force for controlling said drive means, said switch means including two switch elements associated with each of the displaceable members in the drives for a given gripper movement, said switch elements being arranged in series when viewed in the direction in which the member moves against said adjustable force, said first switch element controlling the sequence of the programmed gripper movement, and said second switch elements consisting of a safety switch for disconnecting the handling device.

21. A handling device with a flexible gripper and having drive means for moving said gripper, said drive means comprising a displaceable force transmitting member, means for exerting an adjustable force on said member for normally preventing movement thereof, said means permitting movement of said member in response to stoppage of movement of said gripper when the force thereon is greater than said adjustable force, switch means responsive to movement of said member against said adjustable force for controlling said drive means, and wherein said handling device is a fully closed unit including a hydraulic and electric supply unit.

22. A handling device according to claim 21, wherein the hydraulic and electric supply units are accommodated in a pillar and/or in an upper frame connected with the pillar, thus enabling the height of the underframe to be very small.

* * * * *